United States Patent [19]

Leenhouts et al.

[11] Patent Number: 5,004,324
[45] Date of Patent: Apr. 2, 1991

[54] LIQUID CRYSTAL DISPLAY

[75] Inventors: Frans Leenhouts, Kaiseraugst; Martin Schadt, Seltisberg, both of Switzerland

[73] Assignee: Hoffmann-La Roche Inc., Nutley, N.J.

[21] Appl. No.: 465,593

[22] Filed: Jan. 18, 1990

Related U.S. Application Data

[63] Continuation of Ser. No. 356,564, May 24, 1989, abandoned, which is a continuation of Ser. No. 94,572, Sep. 9, 1987, abandoned.

[30] Foreign Application Priority Data

Sep. 12, 1986 [CH] Switzerland .................. 3671/86

[51] Int. Cl.$^5$ .............................................. G02F 1/13
[52] U.S. Cl. ..................... 350/347 R; 350/346; 350/337; 350/341
[58] Field of Search ............... 350/346, 340, 341, 334, 350/347 E, 337, 347 R

[56] References Cited

U.S. PATENT DOCUMENTS

| | | | |
|---|---|---|---|
| 4,398,803 | 8/1983 | Pohl et al. | 350/334 |
| 4,552,436 | 11/1985 | Kozaki et al. | 350/337 |
| 4,596,446 | 6/1986 | Waters et al. | 350/346 |
| 4,652,088 | 3/1987 | Kando | 350/334 |
| 4,653,861 | 3/1987 | Kando et al. | 350/337 |
| 4,653,865 | 3/1987 | Kando et al. | 350/346 |
| 4,664,482 | 5/1987 | Kando et al. | 350/337 |
| 4,759,612 | 7/1988 | Nakatsuka et al. | 350/338 |

FOREIGN PATENT DOCUMENTS

| | | | |
|---|---|---|---|
| 0018180 | 4/1980 | European Pat. Off. | |
| 0131216 | 1/1985 | European Pat. Off. | 350/337 |
| 0092518 | 7/1981 | Japan | 350/337 |
| 0090618 | 6/1982 | Japan | 350/337 |
| 60-107020 | of 1985 | Japan | 350/337 |
| 60-50511 | 3/1985 | Japan . | |
| 60-52827 | 3/1985 | Japan . | |
| 60-73525 | 4/1985 | Japan . | |
| 0026024 | 2/1986 | Japan | 350/337 |
| 2145837 | 8/1984 | United Kingdom . | |
| 2154016 | 8/1985 | United Kingdom | 350/337 |

OTHER PUBLICATIONS

Schadt et al., "Electro-Optical Performance of a New, Black-White and High Multiplexable Liquid Crystal Display", Appl. Phys. Lett., vol. 50, No. 2, Feb. 1987.

*Primary Examiner*—Stanley D. Miller
*Assistant Examiner*—Huy K. Mai
*Attorney, Agent, or Firm*—George M. Gould; Bernard S. Leon; George W. Johnston

[57] ABSTRACT

A liquid crystal display (LCD) cell comprising a highly twisted nematic liquid crystal disposed between two electrode plates and polarizers and having a positive dielectric anisotropy. The optical path difference $\Delta n \cdot d$ is 0.2 to 0.7 $\mu$m and the ratio $d/p$ of thickness to pitch is 0.2 to 0.6. The absolute value of the twist angle $\phi$ can be between 120° and 260° for a right-hand twist or left-hand twist, the angle $\psi$ between the polarizers can be between 0° and 180° and the angle $\beta$ between the surface orientation direction and the polarization direction on the screen on the light incidence side can be between 0° and 360°.

9 Claims, 2 Drawing Sheets

LIQUID CRYSTAL DISPLAY

This application is a continuation of application Ser. No. 07/356.564. filed May 24, 1989, now abandoned. which is a continuation of application Ser. No. 07/094.572, filed Sept. 9, 1987, now abandoned.

FIELD OF THE INVENTION

The invention relates to a liquid crystal display (LCD) cell having a highly twisted nematic liquid crystal layer which has a positive dielectric anisotropy.

BACKGROUND OF THE INVENTION

The LCD cell according to the invention is of very similar construction to known cells, such as twisted nematic LCD's. Schadt and Helfrich, Appl. Phys, Lett. 18, 127 (1971).

It has been known for some time that LCD cells having highly twisted nematic liquid crystals, despite their intensive interference colours in the off state, have advantages over similar cells having a 90° twist. The term "highly twisted nematic structures" is to be understood as denoting structures having a twist of more than 90°. Doping with chiral additives is usually necessary to produce such a twist as is known in the art.

The main advantages of liquid crystal cells having highly twisted nematic structures are a very steep electro-oPtical characteristic and a wide viewing angle range. The steep electro-optical characteristic results in high multiPlex ratios which are necessary to provide displays of high information density.

Apart from earlier ProPosals for high-twist liquid crystal cells based on the guest-host effect, one of the first high-twist nematic liquid crystal cells without any colouring additive was the one disclosed in European Patent Application No. 131 216 of Amstutz. H. et al. The liquid crystal of this cell has a twist of from 180° to 360°.

The polarizers are offset at angles of from 20° to 70° relative to the orientation directions on the screens. The ratio d/p between the layer thickness (d) and pitch (P) of the liquid crystal is between 0.5 and 0.95. The cell requires a sPecial wall orientation on the electrode surfaces, leading to high tilt angles of the nematic director. Wall orientations of this kind are complex to produce and therefore expensive.

Subsequently, increasing work was done in various places on the develoPment of liquid crystal cells having high-twist nematic structures, because LCDs are being increasingly used in large-area high-density-information applications and high multiplexibility is essential for this Particular use. Thus, many angle ranges between 90° and 360° for the twist and for the arrangement of the polarizers relative to the surface orientations and to one another and for the proportions of the optical anisotropy $\Delta n$, the electrode distance or thickness d and the natural pitch p of the chirally doped nematic liquid crystal relative to one another have been suggested. Various advantages have been alleged for each of the disclosed high-twist structures, with the emphasis on improved multiplexibility and improved range of viewing angles. A disadvantage was found to be the intensive interference colours of such display cells which, if colour variations are to be avoided, call for very accurate plate spacing and, therefore, exPensive and highly precise production processes. Also, the strong inherent colouring of such disPlays is an obstacle to their use as neutral-colour electro-oPtical switches such as are required inter alia for colour TV or for coloured display screens.

The Problem which it is the object of the invention to solve arises from the Present need for even better LCD cells with more particularly less inherent colouring, the possibility of producing grey tones, simple production. short switching times together with high optical contrast, reduced dePendence uPon viewing angle, good multiplexibility and a display Picture which is relatively unaffected by variations in the plate sPacing of the cell.

SUMMARY OF THE INVENTION

It has been found that, using a combination of cell and material Parameters according to the invention, much better results can surprisingly be achieved than Previously known from high-twist nematic liquid crystal displays.

In a Preferred embodiment, the LCD cell according to the invention is distinguished by the combination of: a twist angle $\phi$ of about 180°; an angle $\beta$ between the surface orientation direction and the polarization direction at the plate on the light incidence side of about 0° or about 90°; an angle $\psi$ between the polarization direction at the plate on the light incidence side and the polarization direction at the plate on the light exit side of about 90° for $\beta=0°$ and of about 0° for $\beta=90°$; an optical path difference $\Delta n \cdot d$ (d in $\mu m$) of about 0.2 to about 0.7 $\mu m$: and a ratio d/P of thickness ("d") to pitch ("P") of about 0.2 to about 0.6. The values of the angles $\phi$, $\psi$ and $\beta$ may vary from the values given within the following ranges: the absolute value of the twist angle $\phi$ can be between about 120° and about 260° for a right-hand twist or left-hand twist, the angle $\psi$ can be between about 0° and about 180° and the angle $\beta$ can be between 0° and 360°.

The angle ranges just defined include both positive and negative contrast displays of the cell.

In positive contrast displays electrically energised segments aPPear dark on a bright background whereas in negative contrast displays the situation is the converse.

BRIEF DESCRIPTION OF THE DRAWINGS

The preferred embodiments of the invention will be described hereinafter with reference to the drawings. wherein.

DESCRIPTION OF THE PREFERRED EMBODIMENT

Figure 1:
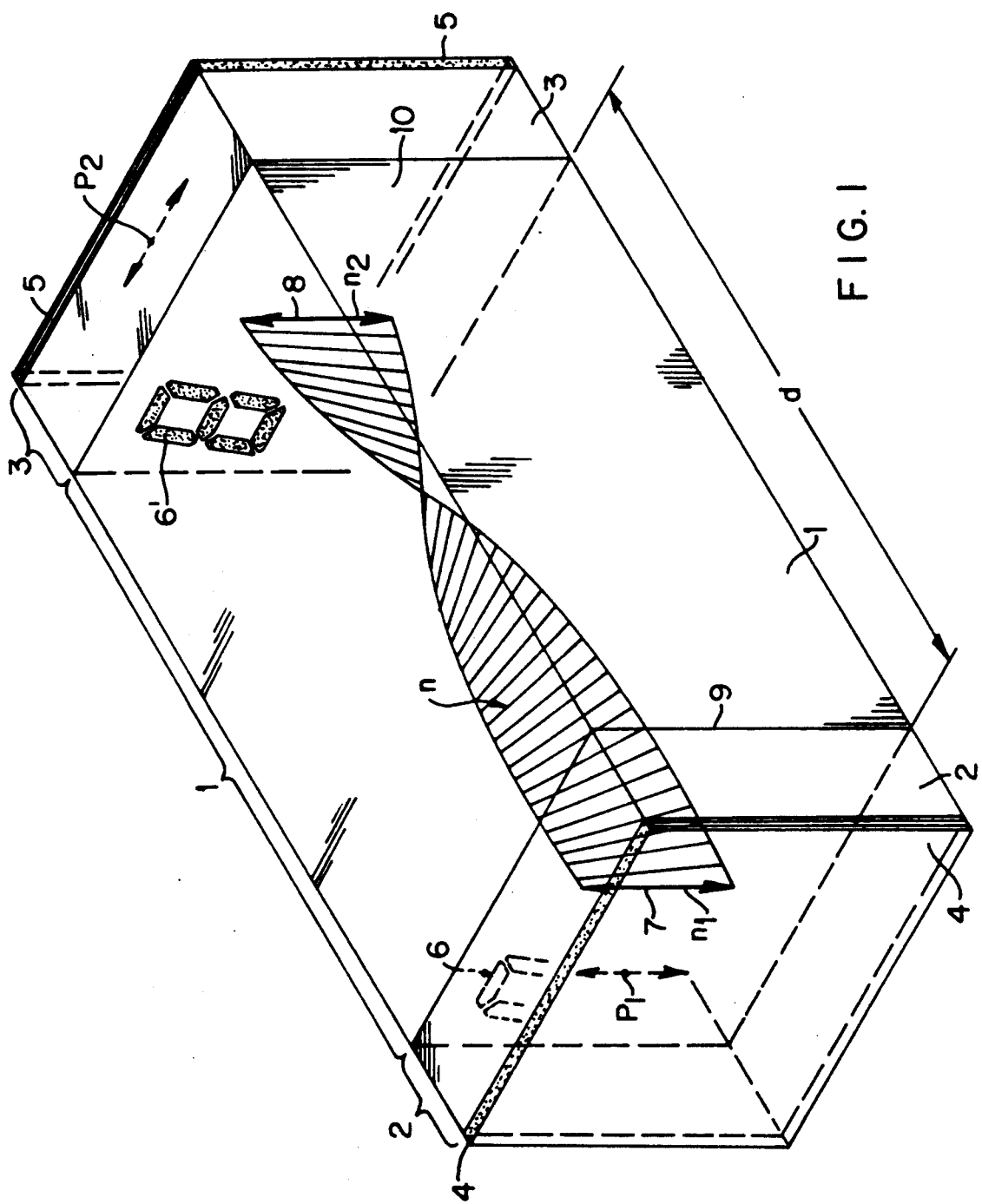
FIG. 1 is a diagrammatic exPloded view of an LCD cell according to the invention.

The cell according to the invention is illustrated in FIG. 1 which shows from left to right a front plate 2, a liquid crystal layer 1 and a rear plate 3. As used herein, the terms "front" and "frontal" shall refer to the lower left-hand corner of FIG. 1. The terms "rear" and "rearward" shall refer to the upper right-hand corner of FIG. 1. The term "inward" shall refer to a position directed towards the liquid crystal layer 1.

The liquid crystal layer 1 is located between the front plate 2 and the rear plate 3. Plates 2 and 3 are substantially Plane-parallel to one another and are made of a transparent material, such as glass, acrylic glass, plastic foils or the like. A polarizer 5 is located on a rearward side of rear plate 3 and is preferably connected thereto, for example, by sticking. A second polarizer 4 is similarly located on a frontal side of front Plate 2. The plates 2 and 3 are separated from one another by a sPacing or gap d.

On inward surfaces 9 and 10 of the Plates 2 and 3, respectively, adjacent the liquid crystal layer 1 the plates 2 and 3 have conventional electrode coatings 6 and 6'. respectively, segmented for a predetermined tyPe of disPlay (for example, characters or dots).

Also, the inward surfaces 9 and 10 are preferably treated as described below to exert a directional effect on adjacent liquid crystal molecules and thus determine the direction of a nematic director n of the liquid crystal layer 1. The treatment resides, for example, in rubbing the inward surfaces 9 and 10 in one direction or in the oblique evaporation coating of orienting layers etc; it is not necessary, but neither is it disadvantageous, to provide a tilt angle as is known in the art. The result of this treatment will be called surface orientation for the purpose of the Present description. An arrow 7 indicates the surface orientation on the inward surface 9 of the front plate 2. A surface orientation on the inward surface 10 of the rear plate 3 extends parallel to that of the front plate 2 and is indicated by an arrow 8. As will become aPparent hereinafter, it is not vital for the surface orientations 7 and 8 of the two plates 2 and 3 to be parallel to one another. Variations in both directions are possible without substantial impairment of cell operation.

The front plate polarizer 4 has a polarization direction $p_1$. The rear polarizer 5 has a polarization direction $p_2$. In the preferred embodiment, the polarization directions $p_1$ and $p_2$ are perpendicular to one another.

The liquid crystal layer 1 comprises a nematic liquid crystal doPed with chiral additives as will be described more fully below. The liquid crystal layer 1 therefore takes on a spontaneous twist having a predetermined pitch p. As a result of co-operation between the spontaneous twist, due to the chiral additives, and the surface orientation, the crystal layer 1 assumes a twist of 180° in the preferred embodiment. This results in the twist, shown in FIG. 1, of nematic directors $n_1$, on the front plate 2 and $n_2$ on the rear plate 3 of 180° relative to one another.

Figure 2:
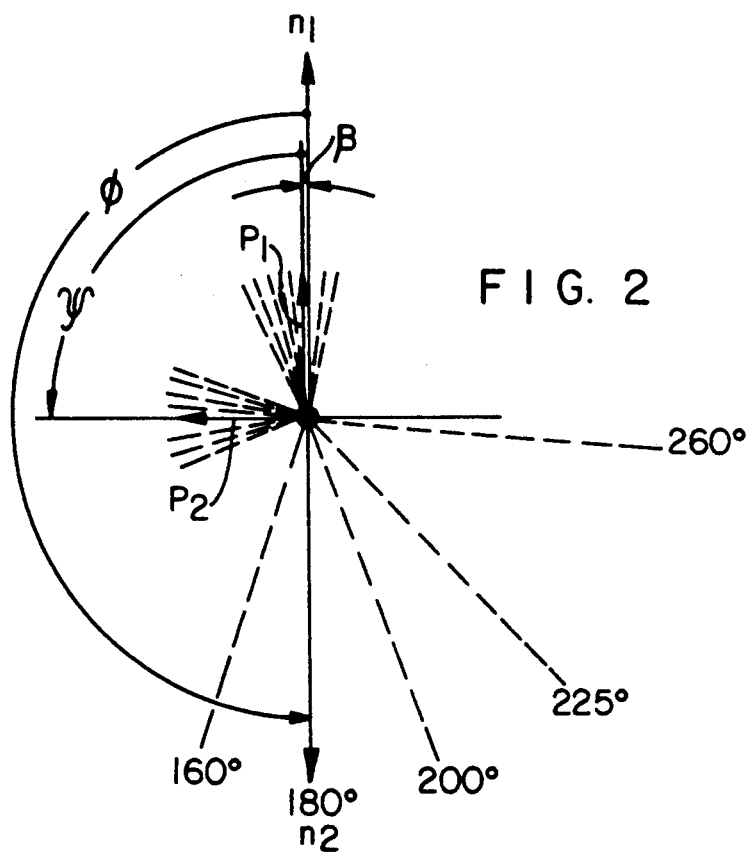
FIG. 2 is a diagram showing the arrangement of angles, the surface orientations and the polarizers of the LCD cell according to the invention relative to one another.

FIG. 2 illustrates the relative angular relationships of the nematic directors and the polarization directions. As previously stated, $n_1$ is the nematic director on the front plate 2 and $n_2$ is the nematic director on the back plate 3. The angle of twist between the two nematic directors $n_1$ and $n_2$ has the reference $\phi$. This angle is 180° in the preferred embodiment. However, it can vary on either side of 180°. Satisfactory results are obtained with absolute values of $\phi$ of between 120° and 260° for either a right-hand or left-hand twist.

In the preferred embodiment the polarization direction $p_1$ of the front polarizer 4 extends parallel to the nematic director $n_1$. However, the direction $p_1$ can vary by an angle $\beta$ from the nematic director $n_1$, satisfactory results being obtained in the range $0° \leq \beta \leq 360°$. However, the direction $p_1$, can be perPendicular to the nematic director $n_1$ and the Polarization direction $p_2$ can be parallel to $n_1$. Here again satisfactory results are obtained within a range of variation $0° \leq \beta \leq 360°$.

The Polarization direction $p_2$ of the rear polarizer 5 is rotated relative to the polarization direction $p_1$ of the front Polarizer 4 by an angle $\psi$ which in the preferred embodiment of a Positive contrast display is 90° (crossed polarizers). However, the angle $\psi$ can be between about 0° and about 180°. Contrast reversal occurs at angles $\phi$ and $\beta$, which are equal in other respects, when $\psi = 0°$ (Parallel Polarizers). In another preferred embodiment for a negative contrast display, $\phi = 180°$, $\beta = 0°$ and $\psi = 135°$. Variations in the ranqes of $\psi$, $\phi$ and $\psi$ which would be within the scope of the invention are indicated for example by corresponding shadings in the diagram of FIG. 2.

When describing angles $\phi$, $\beta$ and $\psi$ herein a positive angle shall refer to a left-hand rotation while a negative angle shall refer to a right-hand rotation travelling from the front plate 2 to the rear plate 3.

In an especially preferred embodiment, for example, $\phi = -175°$, $\beta = 350°$ and $\psi = 70°$ (positive contrast) and $\phi = 175°$, $\beta = 5°$ and $\psi = 135°$ (negative contrast); the following liquid crystal mixture (mixture A) in a layer d $= 5 \mu m$ thick was used:

| Component | | Concentration (weight %) |
|---|---|---|
| φd(4)CP = | p-[trans-4-(4-pentenyl)cyclo-hexyl]benzonitrile | 8.780 |
| 3CPO2 = | 1-ethoxy-4-(trans-4-propyl-cyclohexyl)benzene | 7.320 |
| 3CPS = | p-(trans-4-propylcyclohexyl)-phenyl isothiocyanate | 11.700 |
| 4P(1)P = | p-(5-butyl-2-pyrimidinyl)-benzonitrile | 4.870 |
| 3CAP2 = | 4-ethyl-1-[2-(trans-4-propyl-cyclohexyl)ethyl]benzene | 4.390 |
| 4CEPO2 = | trans-4-butylcyclohexane-carboxylic acid p-ethoxy-phenyl ester | 10.730 |
| 5CEPO1 = | trans-4-pentylcyclohexane-carboxylic acid p-methoxy-hexyl ester | 10.730 |
| 4CEC4 = | trans-4-butylcyclohexane-carboxylic acid trans-4-butyl-cyclohexyl ester | 9.280 |
| 4PP(1)P = | p-[5-(4-butylphenyl-2-pyri-midinyl]benzonitrile | 4.400 |
| φd(4)CPP = | 4'-[trans-4-(pentenyl)cyclo-hexyl]biphenylcarbonitrile | 6.850 |
| Od(4)CPP3 = | 4'-[trans-4-(4-pentenyl)cyclo-hexyl]-4-propylbiphenyl | 5.850 |
| 5CPAC4 = | 1-[2-(trans-4-butylcyclo-hexyl)ethyl]-4-(trans-4-pentylcyclohexyl)benzene | 9.750 |
| 5CPPAC4 = | 4-[2-(trans-4-butylcyclohexyl)-ethyl]-4'-(trans-4-pentyl-cyclohexyl)biphenyl | 5.350 |

This mixture was also given an appropriate amount of 16β-methyl-17-oxo-androst-5-en-3β-yl acetate ("ST9") as a chiral additive. Other chiral additives are known in the A second embodiment of the invention was prepared using the following mixture "B":

| Component | | Concentration (weight %) |
|---|---|---|
| φd(3)CP = | p-[trans-4-(3-butenyl)-cyclohexyl]benzonitrile | 10.000 |

-continued

| Component | | Concentration (weight %) |
|---|---|---|
| 1d(3)CP = | p-[trans-4-(3E-pentenyl)-cyclohexyl]benzonitrile | 10.000 |
| 4P(1)P = | p-[trans-4-(3E-pentenyl)-cyclohexyl]benzonitrile | 6.000 |
| 5CC(O)d(3)φ = | r-1-cyan-1-(3-butenyl)-cis-4-(trans-4-pentylcyclo-hexyl)cyclohexane | 10.000 |
| 4CEC4 = | r-1-cyano-1-(3-butenyl)-cis-4-(trans-4-pentylcyclo-hexyl)cyclohexane | 12.000 |
| 5CEC3 = | trans-4-pentylcyclohexanecar-boxylic acid trans-4-propyl-cyclohexyl ester | 12.000 |
| 3CEC3 = | trans-4-propylcyclohexanecar-boxylic acid trans-4-propyl-cyclohexyl ester | 10.000 |
| 5CPAC4 = | trans-4-propylcyclohexanecar-boxylic acid trans-4-propyl-cyclohexyl ester | 12.000 |
| 5CPPAC4 = | trans-4-propylcyclohexanecar-boxylic acid trans-4-propyl-cyclohexyl ester | 4.000 |
| 3CEPCd(3)1 = | trans-4-propylcyclohexanecar-boxylic acid p-[trans-4-(3E-pentenyl)cyclohexyl]phenyl ester | 8.000 |
| 5CPAPAC4 = | 4-(trans-4-pentylcyclohexyl)-4'-[2-(trans-4-butylcyclo-hexyl)ethyl]-1,1'-ethylene-dibenzene | 6.000 |

This mixture too was given "ST9" as an appropriate chiral additive. Again, other chiral additives are known in the art.

The designation of the components is known to those skilled in the liquid crystal technology. Reference is made in this connection, for example, to the publications of Schadt. M. et al in Mol. Cryst. Liq. Cryst. 122 (1985) 241 et seq. and in Proc. Int. Displ. Res. Conf., San Diego (1985).

All the relevant Parameters of these two mixtures "A" and "B" are compiled in the following Table 1.

TABLE 1

| | Mixture "A" | Mixture "B" |
|---|---|---|
| Clearing Point $T_{cl}$ [°C.] | 81 | 77 |
| Melting point $T_m$ [°C.] | <−30 | <−30 |
| Diel.const parall. ε | 8.99 | 10.3 |
| Dielec. anisotropy Δε | 4.31 | 6.2 |
| no | 1.482 | 1.499 |
| Optical anisotropy Δn | 0.088 | 0.125 |
| $k_{11}$ [10−12N] | 11.13 | 11.34 |
| $k_{22}$ [10−12N] | 4.98 | 4.47 |
| $k_{33}/k_{11}$ | 1.31 | 1.04 |
| Viscosity η(+22° C.) [mPa · s] | 24 | 27 |
| Viscosity η(−20° C.) [mPa · s] | 350 | 460 |
| Optical path difference Δn · d [μm] | 0.44 | 0.60 |

The electro-oPtical results compiled in the following Table 2 were obtained with these mixtures. The results achieved with the Preferred embodiment of the novel cell ("new cell") according to the invention (φ=180°, β=0°, ψ=90°) are in each case compared with the values obtained with the same liquid crystal mixtures in a conventional twisted nematic (TN) cell (crossed polarizers with 90° twist).

TABLE 2

| | Mixture "A" | | Mixture "B" | |
|---|---|---|---|---|
| | New cell | TN cell | New cell | TN cell |
| $V_{10}$ (θ = 0°) [V] | 2.33 | 2.09 | 1.91 | 2.00 |
| $V_{50}$ (θ = 0°) [V] | 2.41 | 2.44 | 2.01 | 2.24 |
| Steepness of transmission curve Po (θ = 0°) | 0.032 | 0.169 | 0.052 | 0.121 |
| rT (θ = 0°) [%/°c] | — | — | ~−0.28 | −0.28 |
| rθ (V = $V_{10}$) [%/°θ] | — | — | −0.081 | −0.49 |
| Twist angle | −180° | −90° | −180° | 90° |
| Electrode gap [μm] | 5 | 6 | 5 | 8 |
| 2d/p (p = pitch) | 0.55 | 0 | 0.6 | 0 |
| Multiplex ratio $N_{max}$ | 1008 | 42 | 390 | 77 |

θ = Viewing angle

Key to Table 2

$V_{10}$ denotes the optical threshold voltage at 10% extinction (or transmission);

$V_{50}$ denotes the voltage at 50% transmission;

$p_o$ denotes the steepness of the transmission curve at a viewing angle θ=0° in accordance with the $$N_{max} = \left[ \frac{(1+p)^2 + 1}{(1+p)^2 - 1} \right]^2$$

$N_{max}$ denotes the maximum number of multiplexible lines according to Alt and Pleshko, IEEE Trans. Electron Devices, ED-21, 146 (1974):

$$r_T = \frac{V_{10}(40° C.) - V_{10}(0° C.)}{40° C.} \cdot \frac{100\%}{V_{10}(22° C.)} \, [\%/°C.]$$

$r_T$ denotes the temperature dependence of the threshold of voltage $V_{10}$ between 0° C. and 40° C.;

$r_θ$ denotes the angular dePendence of the threshold voltage $V_{10}$ between θ=10° and 40°;

$$rθ = \frac{V_{10}(40°) - V_{10}(0°)}{30°} \cdot \frac{100\%}{V_{10}(10°)} \, [\%/°θ]$$

θ denotes the light incidence angle or viewing angle.

The optical path difference Δn·d is in the present embodiment 0.44 μm with mixture "A" and 0.6 μm with mixture "B". It can be adjusted with good results in the range of about 0.25 to about 0.7 μm, more preferably in the range of about 0.4 to about 0.6.

The absolute value of the ratio d/P of layer thickness d to the natural pitch P is approximately 0.3 in the present embodiment and can be varied with good results in the range of about 0.2 to about 0.8, more preferably from about 0.29 to about 0.4.

Figure 3:
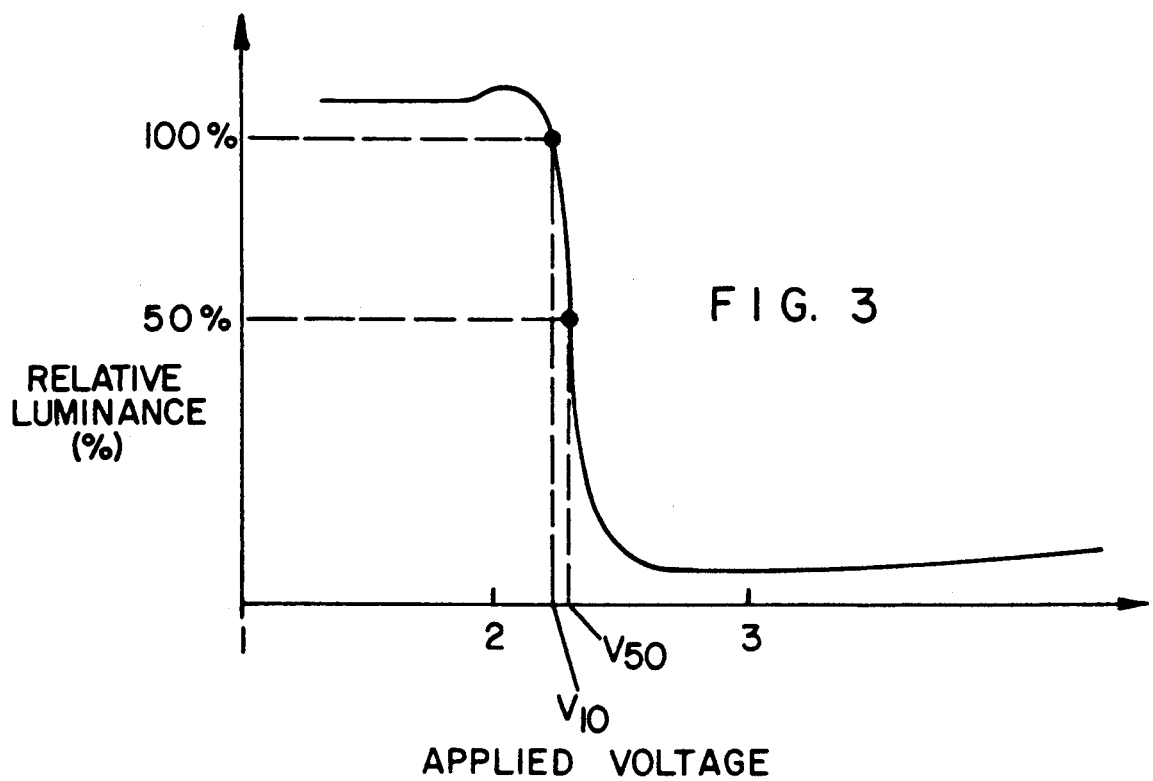
FIG. 3 illustrates a voltage-contrast curve of a preferred embodiment of the LCD cell according to the invention.

FIG. 3 shows the contrast curve characteristic of electro-oPtical behavior taken in white light for the new cell according to the invention using mixture "A" as set forth in Table 2. The extreme steepness of this curve shows that a cell of this kind can provide a high multiplex ratio. In fact multiplex ratios of more than 1000 : 1 at a contrast of 5 : 1; have been achieved (see Table 2). Also, the angle dependence is much better than with 90° TN cells (Table 2) and at least equally as good as in other known high twist cell structures. The very reduced waviness of the curve both in the "off" and "on" states is a result of the low inherent colouring of the cell (black-white or white-black contrast). Especially good results were achieved with the configurations compiled in Tables 3 and 4 below having defined values for the oPtical path difference Δn·d and for the angle $\phi$, $\beta$ and $\psi$. The doping with chiral additives was selected in each case as is known in the art so that resulting pitch together with the Plate gap provided the desired twist angle $\phi$. Table 3 contains configurations which resulted in a positive contrast; table 4 contains configurations for negative contrast.

TABLE 3

| $\phi$ (°) | Δn·d (μm) | $\beta$ (°) | $\psi$ (°) |
|---|---|---|---|
| 180 | 0.4–0.7 | 0 ± 20 | 90 ± 20 |
| " | " | 90 ± 20 | −80 ± 20 |
| 210 | 0.4–0.5 | 0 ± 20 | 90 ± 20 |
| " | " | 90 ± 20 | −80 ± 20 |
| " | 0.6 | 0 ± 30 | 90 ± 20 |
| " | " | 100 ± 20 | −90 ± 30 |
| " | 0.7 | 10 ± 30 | 70 ± 30 |
| " | " | 110 ± 20 | −110 ± 20 |
| 240 | 0.4 | 10 ± 20 | 95 ± 20 |
| " | " | 100 ± 20 | −90 ± 20 |
| " | 0.5 | 30 ± 20 | 95 ± 15 |
| " | " | 120 ± 20 | −90 ± 25 |
| " | 0.6 | 30 ± 25 | 85 ± 20 |
| " | " | 120 ± 25 | −90 ± 25 |
| " | 0.7 | 30 ± 25 | 80 ± 30 |
| " | " | 130 ± 30 | −100 ± 25 |
| 270 | 0.5 | 30 ± 30 | 80 ± 20 |
| " | 0.6 | 50 ± 30 | 70 ± 30 |
| " | " | 140 ± 30 | −100 ± 30 |
| " | 0.7 | 60 ± 30 | 60 ± 30 |
| " | " | 140 ± 30 | −110 ± 30 |

TABLE 4

| $\phi$ (°) | Δn·d (μm) | $\beta$ (°) | $\psi$ (°) |
|---|---|---|---|
| 180 | 0.4 | 25 ± 20 | 40 ± 20 |
| " | 0.5 | 30 ± 20 | 30 ± 20 |
| " | " | 125 ± 20 | 40 ± 20 |
| " | 0.6 | 40 ± 20 | 10 ± 20 |
| " | " | 130 ± 20 | 10 ± 20 |
| " | 0.7 | 60 ± 20 | 150 ± 20 |
| " | " | 150 ± 20 | 150 ± 20 |
| 210 | 0.4 | 40 ± 20 | 50 ± 20 |
| " | " | 130 ± 20 | 50 ± 20 |
| " | 0.5 | 45 ± 20 | 30 ± 20 |
| " | " | 135 ± 20 | 30 ± 20 |
| " | 0.6 | 60 ± 20 | 10 ± 20 |
| " | " | 150 ± 20 | 10 ± 20 |
| " | 0.7 | 80 ± 20 | 160 ± 20 |
| " | " | 170 ± 20 | 160 ± 20 |
| 240 | 0.5 | 160 ± 20 | 30 ± 20 |
| " | 0.6 | 75 ± 20 | 20 ± 20 |
| " | " | 170 ± 20 | 10 ± 20 |
| " | 0.7 | 0 ± 30 | 170 ± 20 |
| " | " | 85 ± 20 | 170 ± 20 |
| 270 | 0.5 | 170 ± 20 | 40 ± 20 |
| " | 0.6 | 10 ± 20 | 20 ± 20 |
| " | " | 100 ± 20 | 20 ± 20 |
| " | 0.7 | 30 ± 40 | 10 ± 20 |
| " | " | 125 ± 40 | 10 ± 20 |

The cells hereinbefore described can be operated in transmission and in reflection.

We claim:

1. A liquid crystal display (LCD) cell having a high mulitplex ratio, short switching time and a display picture which is relatively unaffected by variations in plate spacing of the LCD cell, said LCD cell comprising:
   a highly twisted nematic liquid crystal layer having a positive dielectric anisotropy Δn, a pitch P and a twist angle $\phi$ having an absolute value in a range between about 160° and about 260° for a right-hand twist or left-hand twist;
   a front plate located in front of the liquid crystal layer, said front plate including an inward surface contacting the liquid crystal layer, the inward surface having a surface orientation and also including first electrode means;
   a rear plate located rearward of the liquid crystal layer, said rear plate including an inward surface contacting the liquid crystal layer, the inward surface having a surface orientation and also including second electrode means;
   a front polarizer located in front of aid front plate, said front polarizer having a polarization direction; and
   a rear polarizer located rearward of said rear plate, said rear polarizer having a polarization direction;
   wherein,
   an angle $\phi$ between the surface orientation of the inward surface of the front plate and the polarization direction of the front polarizer is within the range of 0° to 360°;
   an angle $\psi$ between the polarization direction of the front polarization and the polarization direction of the rear polarizer is in the range of about 0° to about 180°;
   said front and rear plates are spaced apart by an optical path difference of Δn·d in the range of about 0.4 to about 0.6 μm which produces a substantially low inherent color in the LCD cell so that a neutral display is achieved; and a ratio d/P of plate spacing d to pitch P is in the range of about 0.2 to about 0.8.

2. A cell according to claim 1. wherein $\phi$ is about

3. A cell according to claim 1, wherein $\phi$ is about 180°, $\beta$ is about 0° and $\psi$ is about 90°.

4. A cell according to claim 1, wherein $\phi$ is about 180°, $\beta$ is about 0° and $\psi$ is about 135°.

5. A cell according to claim 1, wherein $\beta$ is 0° ±10° and $\psi$ is 90° ±40°.

6. A cell according to claim 1, wherein $\beta$=0° and $\psi$=135°.

7. A cell according to claim 1, wherein $\beta$=90°±10° and the Polarizers are crossed.

8. A cell according to claim 1, wherein the ratio d/P of thickness to pitch is in the range of about 0.29 to about 0.4.

9. A cell according to claim 1, wherein $\phi$ is in the range of about 160° to about 210°.

* * * * *

UNITED STATES PATENT AND TRADEMARK OFFICE
CERTIFICATE OF CORRECTION

PATENT NO. : 5,004,324
DATED : April 2, 1991
INVENTOR(S) : Frans Leenhouts and Martin Schadt It is certified that error appears in the above-identified patent and that said Letters Patent is hereby corrected as shown below:

In claim 1:

Column 8, line 23, after "of" and before "front" (third mention on line) delete "aid" and insert therefore -- said --.

Column 8, line 29, change " $\phi$ " -- ß --.

In claim 2, column 8, line 43, after "about" insert -- 180°--.

Signed and Sealed this

Nineteenth Day of January, 1993

Attest:

DOUGLAS B. COMER

*Attesting Officer*    *Acting Commissioner of Patents and Trademarks*